Oct. 21, 1952 W. KELSEY 2,614,920
METHOD OF BREAKING SINTER CAKE DURING SINTERING
Filed Aug. 8, 1950
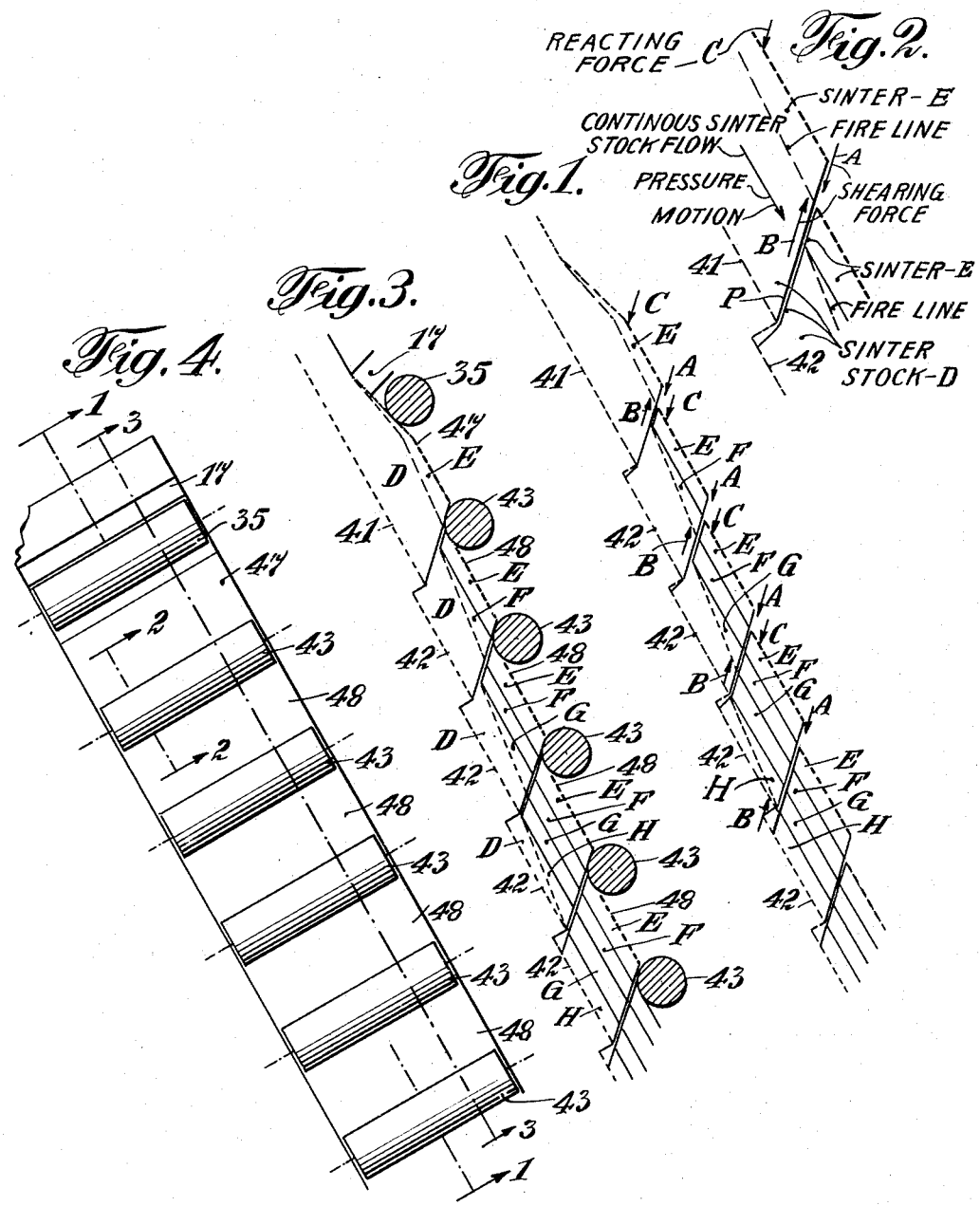
INVENTOR.
Walter Kelsey
BY C. P. Goepel
his ATTORNEY Patented Oct. 21, 1952

2,614,920

UNITED STATES PATENT OFFICE 2,614,920

METHOD OF BREAKING SINTER CAKE DURING SINTERING

Walter Kelsey, New York, N. Y.

Application August 8, 1950, Serial No. 178,195

1 Claim. (Cl. 75—5)

This invention relates to a method of breaking sinter during the sintering of sinter stock to sinter.

In my pending application Serial No. 147,317, filed March 2, 1950, I have featured a sloping sinter pass with steps at intervals forcing the flow of burning sinter to drop from step to step whereby a continual breaking of the flow of sinter takes place during the formation of sinter. The claimed subject matter in that application is for a mechanism. The subject matter of this application is for a method.

The sinter stock and sinter in a sloped gravity flow sinter pass is continually under pressure with all pieces and particles within the mass in intimate contact, the flow of sinter being controlled by the rate of withdrawal of the sinter from the bottom of the pass, but at no time in operation will the withdrawal of the sinter exceed the replacement by sinter stock, or fully release the pressure within the gravity flow sinter pass.

All sintering machines and processes in practical use, up to the present time, are based on the idea that the burning stage of the process must be carried on without any motion between pieces or particles within the mass of such sinter stock. According to this invention the whole mass of sinter stock and sinter being subjected in the flow to a cross draft of air to maintain combustion, has the sinter stock and sinter subjected at spaced intervals to a shifting of the flowing sinter and sinter stock with the fire line between the sinter stock and sinter being continually under pressure for maintaining an intimate contact between all pieces and particles in the flowing mass. This intimate contact of pieces and particles maintained by pressure permits the formation of sinter while there is a relative motion between pieces and particles in the sinter stock mass.

In accordance with the invention, the sinter is formed in layers and each layer is broken into small pieces of sinter by a continually acting shearing action, the thickness of said layer being such that the force to produce such shearing is not large, the shearing action taking place at intervals. During each interval when the shearing takes place, the flow of materials is continued with a minimum of disturbance of the sinter stock mass. When a succeeding layer of sinter is formed, this layer is also subjected to a shearing action and the layer upon it to a second action. The internal relative motion of the particles in the mass is kept at a minimum by the flow control gate at the bottom of the sinter pass combined with the shearing displacement of the mass of flowing sinter stock and sinter at intervals. This breaks up the formation of any long ranged internal disturbing flow caused by the uneven resistances to flow between the top and bottom restraining surfaces. The successive and repeated cracking of the sinter layers results in crevices in the sinter for the air flow in addition to that passing through the porous sinter. This process will give a higher production of sinter than any process at present in use.

In the accompanying diagrammatic drawings used to explain the operation of this method of sintering, Fig. 1 is a diagrammatic cross section drawing of the sinter stock and sinter mass assumed as taken out of and free of the sinter pass for a better understanding of the invention;

Fig. 2 is a sectional side view showing the shearing action on the sinter stock and on the first sinter layer;

Fig. 3 is a side view of a gravity flow sinter pass with the sinter stock and sinter layers therein, showing its movement downward in the sinter pass, and showing the formation of added layers of broken sinter mass; and Fig. 4 is a top view of the sinter pass showing the spaced rollers and the restraining top surface.

Similar characters of reference indicate corresponding parts throughout the drawings.

Referring to the drawings, Fig. 1 is a section at 1—1 of Fig. 4 showing the sinter stock and sinter only of the sinter pass, and brings out the application of the shearing forces A applied to the sinter and the reacting forces B and C. The force A is applied to the formed layer of sinter in such an amount and in such a direction as to displace and shear off the newly formed layer of sinter E. This displacement is the same as the height of the step at the shearing line or zone. The force A is opposed by a reacting force B exerted by the restrained sinter stock resting on the edge of the step 41.

The sinter stock is restrained by the inclosing surfaces of the sinter pass and the pressure from the weight of the sinter material above, acting on the materials at the said shearing zone. The force C exerted by the unbalanced forces A and B is carried through the sinter and is absorbed by the weight of the sinter or is taken up by the top perforated restraining plate (not shown in Fig. 1). The reacting force B compresses the sinter stock in the shearing zone below and at the end of the sinter layer E which is being broken or sheared, said compressed condition in the sinter stock is released as the sinter stock flows down over the edge of the step. The sinter stock and sinter are continually flowing through the sinter pass, the shearing of the sinter is produced by constant force A and reacting forces B and C acting momentarily on the flowing sinter stock and sinter. The second newly formed layer of sinter F is displaced and sheared off in the same way except that the first layer of broken sinter E is between the applied force A and the newly formed layer of sinter F, the reacting force B being exerted by the restrained sinter stock resting on the edge of the step 42. The force C exerted by the unbalanced forces A and B is carried through the sinter layer F and is absorbed by the weight of the sinter in layers E and F or is taken up by the top perforated restraining plate (not shown in Fig. 1). The reacting force B acts as before to compress the sinter stock under the new sinter F and the said compression is released as the sinter stock flows down over the edge of the step. This application of forces and reactions is repeated for each succeeding layer of new sinter G and H in this machine until all the sinter stock in the sinter pass is converted into broken sinter.

Fig. 2 is a sectional force diagram on line 2—2 of Fig. 4 showing the first formed layer of sinter E, the sinter stock D below, showing the application of shearing force A and the displaced position of sinter layer E, the fire line and the sinter stock D below. One arrow shows the direction of continuous sinter stock flow or motion and the direction of the effective pressure of the above flowing stock. The force A and the reacting forces B and C are momentary forces with respect to the flowing sinter, said force A for shearing may be produced by gravity effect on the mass of sinter below the shearing plane P or by gravity with added force as the use of a roller. The reaction to this force A is force B exerted at the top of the sinter stock remaining in place near the shearing plane. The unbalanced force C in the A and B combination of forces is absorbed by the weight of sinter E remaining in place or by added external means. The steps 41 and 42 are shown to locate the momentary force action on the flowing sinter stock and sinter.

Fig. 3 is a sectional view on line 3—3 of Fig. 4 showing the gravity flow stepped sinter pass and the movement layer by layer of the forming broken sinter mass.

The flow of sinter stock in a stepped sinter pass continues, from the ignition means 17 down through the sinter pass, sinter stock and sinter flowing below the guide roller 35 and the top perforated restraining plate 47 to flow on the step 41. The burning of the sinter stock forms a sinter layer E in the upper or front part of the depth of the flow of sinter stock D. This first sinter layer E at this partial stage of sinter formation in the sinter pass is broken into pieces and with the sinter stock D below said first sinter layer E is forced down or sheared by a pressure roller 43 to flow on a lower step 42 below the top perforated restraining plate 48 of the sinter pass. The fire line or burning surface between the new sinter and the sinter stock is not changed in relative position to the flow sinter and sinter stock by the shearing action but remains as before the shearing to continue to carry the burning down into the sinter stock below. The flow of broken sinter and sinter stock and sinter formation continues in the sinter pass until another sinter layer F is formed, at this stage in the formation of the second newly formed sinter layer F, said second layer F is broken by a pressure roller 43 and with the above first broken layer E of sinter and the sinter stock below is forced down by said second roller 43 to flow on a second and lower step 42 below the second top perforated restraining plate 48 of the sinter pass.

The above described procedure in this sinter forming method namely; the formation of new layers G and H of sinter in the flowing sinter stock, the breaking into pieces of said new flowing layers of sinter, the forcing down of previously broken layers of sinter and sinter stock all to continue to flow on lower steps 42 until all the sinter stock in the gravity flow stepped sinter pass is formed into sinter and the stepping and breaking procedure continued as long as the flowing formed combined layers of sinter retains the property to form into a solid cake of sinter.

This method of breaking up new formed flowing sinter gives the desired agglomeration of sinter and the continued breaking up of the flowing sinter layers prevents the formation of a solid sinter cake which is one of the objects of this sintering method. This continual breaking and shearing action on the sinter produces a broken mass of sinter with interstices providing a more free passage of air from the front to the back side of the sinter pass, through the sinter mass than through the original sinter stock. This gives a more rapid burning at the fire line or ignited surface as the sintering of sinter stock progresses, and facilitates a relatively shorter interval between steps of the latter part of the process than at the beginning of the sintering process within the sinter pass.

I have shown rollers coacting with steps, but other shearing force mechanism may be used, and such shearing forces may be applied by hand with the aid of a flat utensil like a board and the steps shown may be modified as long as successive and consecutive stepping action of the sinter layer is carried out during the formation of broken sinter, thus an elastic method is provided for transforming sinter stock into broken sinter to be discharged under control at the bottom of the sinter pass.

Fig. 4 of the drawings shows an inclined plan view of the top of the gravity flow stepped sinter pass bringing out the location of the ignition means 17, the guide roller 35, the pressure rollers 43, the perforated retaining plates 47 and 48. The above items function as the top operating and restraining means in the herein specified sinter production method.

From the foregoing, the following novelty appears: In a gravity flow stepped sintering machine the method of forming of the sinter stock an agglomerated sinter product in a broken condition rather than in an unwieldy cake; the pieces and particles of sinter stock have a relative motion within the burning mass, with said pieces and particles kept in intimate contact during the burning to form sinter; the formation of several separate layers of sinter in sintering the whole depth of sinter in the sinter pass; the combining of the several layers of broken sinter as succeeding layers are formed, the combined layers of formed broken sinter ultimately taking the place of the sinter stock in the sinter pass; and the shearing force applied to the portion of the sinter layer displaced or sheared off is reacted by an opposite force in the sinter stock exerted against the bottom of the part of the layer of sinter remaining in place, the unbalanced force in the shearing action being absorbed by the weight of the layer of sinter remaining in place or is carried to the restraining sinter pass top through said sinter layer.

The improved method contemplates subjecting sinter cake to a breaking up, while it is being formed by the burning of sinter stock, below it, then forming another sinter cake below the agglomeration of broken cake above the remaining sinter stock, and subjecting said newly formed sinter cake and broken sinter cake, to a breaking action while above the sinter stock and while the same is burning, and repeating said actions until the entire sinter stock is converted to broken sinter.

I have described the improved method with the aid of certain means but such means may be varied within the confines of the principle underlying the foregoing method which is applicable to other than the gravity sinter passes.

This is a continuation in part of my pending application Serial No. 147,317, filed March 2, 1950, for Sintering Machines, in that this application is for a method of which one mechanical embodiment is shown in the pending application.

I claim:

The method of converting a flow of stock flowing by gravity in an inclined direction into broken sinter, which consists in burning a first layer of the flow of stock to a first layer of sinter above the stock, subjecting said first sinter layer to a breaking into sinter parts above the remaining part of stock flow, burning a second layer of the flow of stock to a second sinter layer below said first sinter layer and above the remaining flowing stock, subjecting said first and said second sinter layers to a breaking into sinter parts above the remaining part of stock flow, and repeating the burning and breaking of flowing stock layers until the entire stock flow has been converted to sinter layers and into broken sinter, whereby the flow of stock is completely converted into broken sinter.

WALTER KELSEY.

No references cited.